United States Patent Office 3,346,364
Patented Oct. 10, 1967

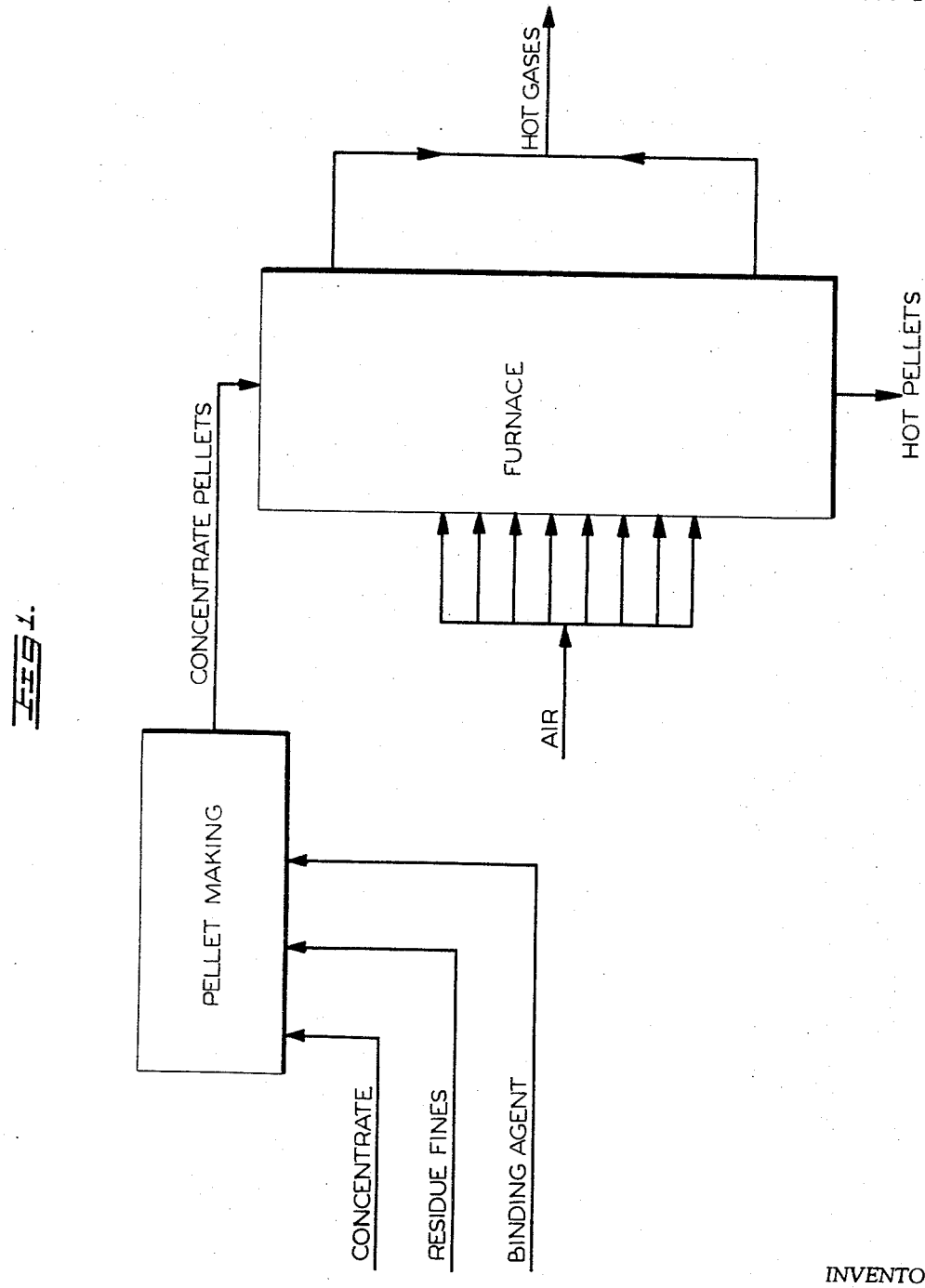

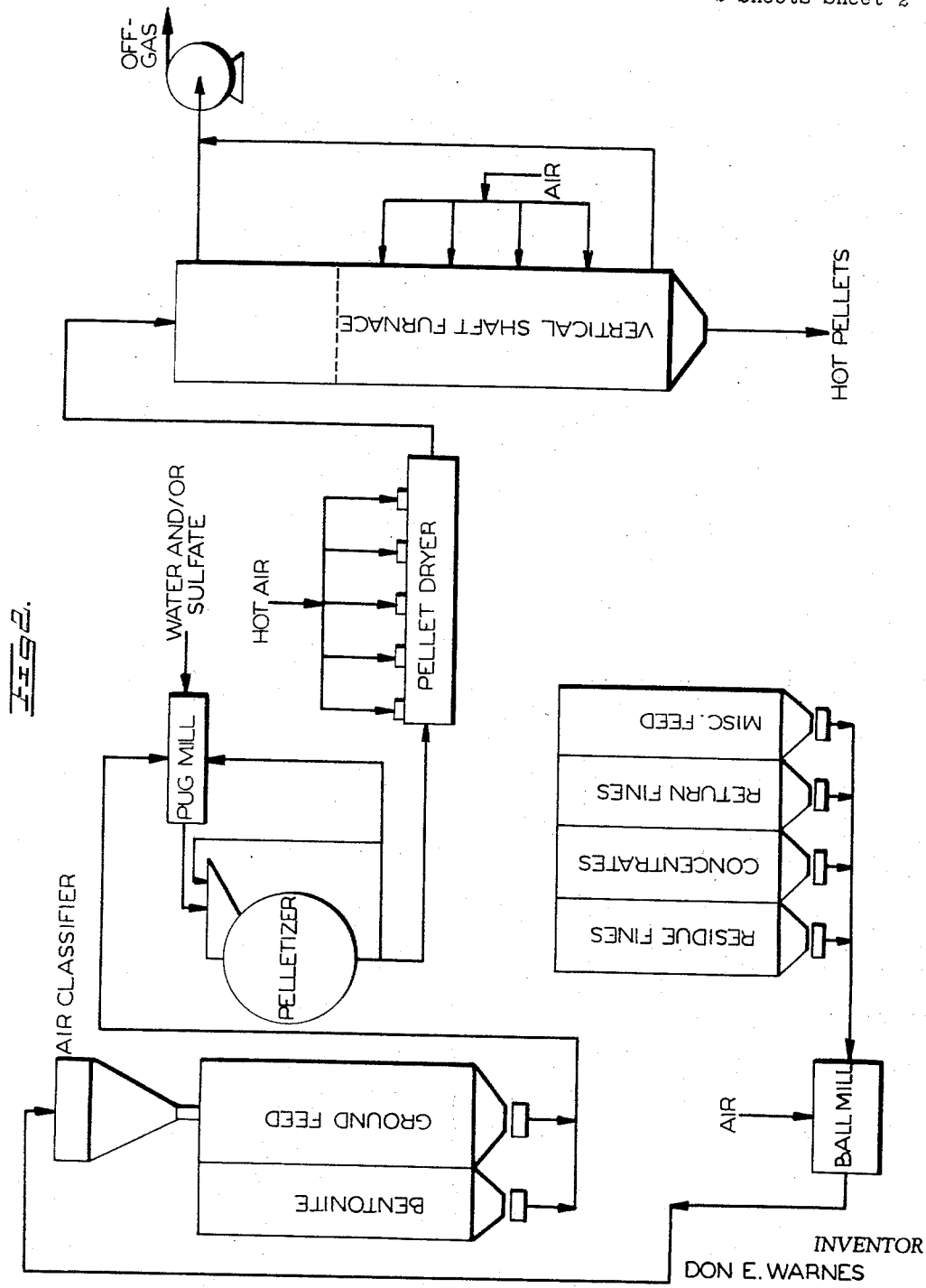

3,346,364
DESULFURIZED ZINC CONCENTRATE PELLETS
Don E. Warnes, Beaver, Pa., assignor to St. Joseph Lead Company, New York, N.Y., a corporation of New York
Filed May 5, 1965, Ser. No. 453,385
6 Claims. (Cl. 75—6)

ABSTRACT OF THE DISCLOSURE

A two-stage roasting treatment for the purification and desulfurization of sized zinc ore concentrate pellets to form hardened zinc oxide pellets suitable for use in an electrothermic reduction furnace for the production of zinc.

The present invention relates to the production of zinc by the reduction of its ores. More particularly, the present invention relates to an improved method for the preparation of zinc oxide pellets for use in an electrothermic reduction process for the production of zinc.

More than 90% of the zinc produced comes from ores which contain the zinc in the form of its sulfide. The zinc content of the ore is concentrated most usually by a flotation process. Typical commercial concentrates contain 54–64% of zinc, 31–34% of sulfur, up to 10% of iron, up to 2% of lead, up to 1% of cadmium and also some copper, manganese and silica.

In order to be suitable for use as a feed for the electrothermic reduction furnace, the zinc concentrate must be desulfurized and, where appropriate, treated for removal of impurities such as lead and cadmium. The concentrate is supplied to the furnace in the form of sized porous agglomerates.

According to present practice, the purification of the zinc concentrate, desulfurization, and the preparation of agglomerates suitable for feed to the electrothermic furnace are accomplished in separate operations. Lead and cadmium levels are reduced by roasting the concentrate in a hearth-type furnace in an atmosphere deficient in oxygen. Essentially complete sulfide sulfur elimination is then accomplished by reroasting the concentrate, preferably in the form of a fluidized bed, with an excess of oxygen. The roasted concentrate is then agglomerated by sintering with coke. The sinter is crushed and screened to the size desired for use as feed to the electrothermic furnace.

It has been found that zinc concentrate pelletized alone or with reduction furnace recycle fines or with other recycled or zinc bearing materials and a binding agent can be heat treated in a single moving-bed furnace to volatilize lead and cadmium sulfides and to desulfurize the concentrate. The upper portion of the furnace, which has an atmosphere deficient in oxygen, is maintained at temperatures suitable for the volatilization of lead and cadmium sulfides. The lower portion of the furnace, which contains a relative excess of oxygen, is maintained at temperatures suitable for oxidizing the sulfide sulfur to sulfur dioxide. At the same time, the pellets of zinc concentrates are hardened by their exposure to the elevated temperatures required for purification and desulfurization.

It is an object of the present invention to provide an improved method for the preparation of zinc oxide pellets for use in electrothermic furnaces.

It is another object of the present invention to provide a method for making more uniform zinc oxide pellets for use in electrothermic reduction furnaces.

It is still another object of the present invention to provide a method in which the zinc concentrate is treated for the removal of lead and cadmium and desulfurized in the same furnace.

These and other objectives and advantages of the present invention will become apparent on consideration of the improved process for preparing pellets for electrothermic zinc reduction furnaces more fully described in the following discussion and accompanying drawings wherein:

FIG. 1 is a flowsheet illustrating a generalized embodiment of the present invention; and, FIG. 2 is a flowsheet illustrating a specific embodiment of the present invention.

The present invention is a method for preparing zinc concentrate pellets, particularly for use in an electrothermic zinc reduction furnace, which comprises: forming pellets from a zinc ore concentrate; causing said pellets to move through a furnace having at least first and second heating zones; subjecting said pellets in the first heating zone to a temperature of about 1150° C. in an atmosphere deficient in oxygen to drive off the volatile impurities in the pellets; and subjecting said pellets in the second heating zone to a temperature betwen about 900–1025° C. in the presence of sufficient oxygen to convert the sulfide sulfur of the pellets to sulfur dioxide and the zinc values to zinc oxide.

The two different temperature zones are achieved by controlling the quantity of oxygen admitted to each zone and the direction of flow of the roasting gases. Additional temperature control can be achieved by regulating the amounts of coolant gas introduced into each of the zones.

Although the present invention is described with particular reference to a method for the preparation of zinc concentrate pellets suitable as a feed for an electrothermic reduction furnace, the approach of the present invention is also applicable to the preparation of zinc concentrate pellets suitable as a feed for other reduction and smelting procedures. For example, the general method of the present invention may be employed to prepare pellets suitable as a feed for the preparation of zinc and/or oxide by means of blast furnaces, rotary kilns, horizontal retorts and grate furnaces.

The present invention is further illustrated by the following discussion and examples:

The zinc ore concentrate is pelletized by conventional means. The resultant pellets must have sufficient mechanical strength to withstand passage through the furnace employed for the purification and desulfurization of the concentrate. The pellets must also be capable of being heat hardened so that they will have the mechanical strength required for their subsequent use in an electrothermic zinc reduction furnace.

Preferably, the zinc concentrate is ground prior to pelletizing. Grinding reduces the size of the relatively few coarse particles present and generally improves particle size distribution. Pellets made from ground concentrate are denser and stronger and have a relatively dust-free surface. Recycled zinc-bearing materials or other zinc-bearing materials are also, preferably, ground prior to pelletizing. Ground residue fines from the electrothermic reduction furnace when incorporated into the pellet mix have little effect on pellet strength.

Conventional binding agents such as the clays and silica-containing materials are added to the pellet mix to improve the mechanical strength of the pellet. Bentonite, a silica-alumina clay, is a particularly preferred binding agent. The mechanical properties of the pellets are also improved by the incorporation of zinc sulfate liquor into the pellet mix. Various methods for making pellets are well known to those skilled in the art and the present invention is not to be limited to the particular pellet-making systems herein described.

As indicated above, the zinc concentrate may contain lead and cadmium impurities. These impurities are usually present as the sulfides. Vaporization of these sulfides from the concentrate is favored at elevated temperatures and purification at maximum temperatures is preferred. Temperatures of up to about 1150° C. can be safely employed without causing the individual pellets to stick to each other. Vaporization of lead and cadmium sulfides is favored by the presence of an atmosphere deficient in oxygen. In the presence of too much oxygen, the lead and cadmium sulfide are converted to their less volatile oxides. However, at temperatures between 1000° C. and 1150° C., the vapor pressure of the oxides is still appreciable and purification of the pellets will continue, although at a slower rate. The presence of small amounts of water vapor in the roast gas appears to aid lead and cadmium elimination presumably by inhibiting their conversion to the oxides.

The electrothermic reduction furnace recycle fines added to the pellet mix contain a certain amount of carbon. Most of this carbon is eliminated in the lead and cadmium purification stage by oxidation to gaseous oxides.

The residual sulfide sulfur content of the zinc concentrate is eliminated essentially by the conversion of zinc sulfide to zinc oxide. This conversion is favored by elevated temperatures and does not occur at an appreciable rate below 550° C. The conversion remains incomplete at temperatures up to about 750° C., the zinc being in the form of its sulfate. Sulfur elimination proceeds at a maximum rate between 900–1025° C. The rate of sulfur elimination decreases markedly at temperatures greater than 1025° C. Desulfurization is favored by the presence of excess oxygen in the roast gas. The sulfur is eliminated as sulfur dioxide and enough oxygen must be supplied to combine with all of the sulfide sulfur and the zinc values that are present. The falling of the rate of desulfurization at higher temperatures is attributed to the pellets losing their porosity to oxygen at temperatures above about 1025° C.

It is apparent that the conditions which favor volatilization of lead and cadmium sulfides from the zinc concentrate are not the same as those which favor the complete desulfurization of the concentrates. Optimum deleading and optimum desulfurization cannot be accomplished in a single roasting zone. For this reason, the furnace employed in practicing the method of the present invention is divided into at least two zones. The first or upper zone is maintained at temperatures suitable for the volatilization of lead and cadmium sulfides; the second or lower zone is maintained at temperatures suitable for the desulfurization of zinc sulfide. Sufficient air is fed to the second heating zone so that the excess of oxygen required for desulfurization is present at all times in that zone. At the same time, an atmosphere deficient in oxygen is maintained in the first zone. In a preferred embodiment of the present invention, hot sulfur dioxide-containing gases pass from the second zone to the first zone to aid in transferring heat from the second zone to the first zone, to aid in maintaining the atmosphere in the first zone deficient in oxygen and to act as a sweep gas in promoting the volatilization of lead and cadmium sulfides.

Heat hardening of the concentrate pellets takes place at the same time the concentrate is being deleaded and desulfurized by passage through the hot furnace. The hot pellets exiting from the furnace may be cooled by heat exchange with the air being fed to the furnace. In the event the pellets exiting from the furnace do not have sufficient mechanical strength to withstand conditions in the electrothermic zinc reduction furnace, the pellets may be further heat hardened by induration at a temperature of about 1225° C. Hardening at temperatures above about 1300° C. causes the pellets to lose their porosity and amenability to reduction.

The roast gases exiting from the deleading and desulfurization furnace contain sulfur dioxide, and lead and cadmium sulfides. The hot gases are most conveniently cooled and their heat content recovered by passage through waste heat boilers. The lead and cadmium values may be separated from the gas stream by electrostatic precipitation and wet scrubbing, and recovered by appropriate chemical treatment. The sulfur values present in the gas stream may be recovered by conversion of the sulfur dioxide to sulfuric acid.

The invention is further illustrated by the following nonlimiting examples:

FIG. 1 is a flowsheet illustrating the generalized operation of the process of the present invention. As shown in the figure, the first step in the process is the making of concentrate pellets. Zinc ore concentrate, electrothermic reduction furnace residue fines and a binding agent are ground together and made into pellets. The pellets are sized and then dried to remove the water used in pellet making. As shown, the pellets are fed to the top of a vertical furnace. Deleading and cadmium removal occur in the upper portion of the furnace. Air is fed to the middle and lower portion of the furnace to assist in desulfurization of the pelleted concentrate. The purified, desulfurized and heat-hardened pellets are removed at the bottom of the furnace. The hot roast gases are removed at locations near the top and bottom of the furnace for passage to the waste heat boiler for recovery of the heat and the lead, cadmium and sulfur values contained therein.

In optional procedures not shown in the figure, the hot pellets of concentrate exiting from the furnace may be cooled by heat exchange with an oxygen-containing gas. The gas may be some or all of the air being fed to the furnace. Heating of the feed air may be accomplished in a third zone within the furnace wherein the hot, completely desulfurized pellets of concentrate are contacted with air being passed to the reaction zones of the furnace. Desulfurization is an exothermic reaction and the temperature within the desulfurization zone is controlled by controlling the temperature and the rate at which air is fed to the desulfurization zone.

FIGURE 2 is a flowsheet illustrating a specific embodiment of the present invention. Zinc ore concentrate, residue fines from the electrothermic reduction furnace, return fines and any miscellaneous recycled or zinc-containing feed are passed from their respective storage tanks to a ball mill. A typical chemical analysis of the Balmat zinc ore concentrate employed is as follows:

| | Percent |
|---|---|
| Zn | 57.5 |
| S | 32.0 |
| Pb | 0.38 |
| Cd | 0.12 |
| Fe | 5.5 |
| Cu | 0.12 |
| Mn | 0.28 |
| $SiO_2$ | 0.51 |

Although most zinc concentrates can be pelletized as received, some grinding of the coarser concentrates improves the physical properties of the resultant pellets. The following table shows the screen analysis of a typical concentrate. Batch I is the concentrate as it is received; batches II and III are the same concentrate subjected to different degrees of grinding.

| Tyler Mesh No. | Batch I, Percent | Batch II, Percent | Batch III, Percent |
|---|---|---|---|
| +80 | 6 | | |
| −80, +100 | 6 | 1 | |
| −100, +200 | 19 | 15 | |
| −200, +325 | 27 | 28 | 21 |
| −325 | 42 | 57 | 77 |

Zinc concentrates within the size ranges shown above can be pelletized with little difficulty. However, the coarse particles in unground concentrate gives rise to a pellet with a rough surface which is subject to attrition during handling, especially when the pellets are dry. In order to minimize loss by attrition, it is desirable to grind the coarse concentrates to remove most of the +100 mesh material.

Concentrate subjected to intermediate grinding and having a size range similar to batch II makes a pellet with a smooth, firm surface and good physical strength. Further grinding of this material is unnecessary and deleterious to pellet strength.

Concentrates subjected to over-grinding and having a size range similar to batch III form pellets easily, but the pellets are usually irregular and misshapen. Further grinding of the concentrate only aggravates this condition. Irregular pellets are weaker than spherical pellets and form less permeable beds.

The preferred grind for pelletizing has a particle size distribution of approximately 98% −100 mesh and 50–60% −325 mesh. Concentrates which are coarser than this should be ground further; concentrates which are finer than this can be blended with other coarser concentrates to achieve the desired particle size range.

The mixture fed to the ball mill contains about 80% by weight of Balmat concentrate and 20% by weight of −40 mesh electrothermic reduction furnace residue fines. Typical residue fines contain 16.5% Zn, 0.28% Pb, 0.91% S, 19.0% C and 16.0% Fe. The mixture is ground for about ½ hour before being air classified and passed to the ground feed storage tank. Additional grinding or grinding of the mixture to too fine a size will result in a weaker pellet being formed in subsequent steps.

A mixture of the ground feed and about 2% by weight of bentonite is passed to a pug mill. The dry mixture is wet with water and made into pellets in a rotating balling drum. The pellets are formed by alternately adding small amounts of concentrate and water to the system until the pellets are about ½ inch in diameter. Replacement of all or part of the water with a zinc sulfate liquor containing 36 grams of zinc per liter tended to improve the ultimate strength of the pellet. The zinc and sulfur values of the liquor are incorporated into the concentrate pellet and are subsequently recovered in the process.

The rate of sulfur elimination, and hence the residence time of the pellets in the desulfurization furnace, depends inter alia, on the size of the pellets undergoing desulfurization. Similar considerations apply in the electrothermic reduction furnace. Uniform size distribution of the pellets makes it more feasible to maintain optimum operating conditions during desulfurization and subsequently during reduction.

A pellet size of about ½″ in diameter is preferred, both in the desulfurization furnace and the electrothermic reduction furnace. Smaller pellets pack more tightly and their use would result in an undesirable increase in the resistance to overall gas flow throughout the pellet bed. Larger pellets tend to require a longer residence time to the pellets in the desulfurization furnace, as well as in the electrothermic reduction furnace.

The sized pellets are dried by means of hot air before being passed to the deleading and desulfurizing furnace. Not all of the water added in the pelletizing procedure is removed because the presence of some water vapor has a beneficial effect in inhibiting oxidation while the concentrate is being deleaded. Moisture may also be added to control the temperature in the deleading zone. Before deleading and desulfurization, typical pellets made from 80% Balmat concentrate and 20% electrothermic furnace residue fines plus 2% bentonite and pelletized with zinc sulfate liquor have the following dry basis analysis:

|  | Percent |
|---|---|
| Zn | 50.6 |
| Fe | 7.5 |
| S | 25.9 |
| Cd | 0.11 |
| Pb | 0.24 |
| C | 3.6 |

The sized and dried pellets are passed to the top of a vertical shaft furnace which is divided into two heating zones as indicated by the broken line. Lead and cadmium compounds are volatilized and driven off in the upper zone; the concentrate is desulfurized in the lower zone. The upper heating zone is maintained at about 1150° C. and the lower zone at about 900–1025° C. to promote deleading and desulfurization, respectively. As shown in the figure, air is passed to several locations in the lower heating zone to provide the oxygen required for desulfurization. The hot gas passing through the upper or deleading zone has been depleted of much of its oxygen and contains sulfur dioxide formed in the desulfurizing zone. Hot off-gas is collected from locations near the top and bottom of the furnace for recovery of heat, sulfur, lead and cadmium values as previously discussed. A typical off-gas contains 2.6% $O_2$, 9.1% $SO_2$, 3.7% $CO_2$, 8.3% $H_2O$ and 76.3% $N_2$.

The degree to which the zinc concentrate is purified and desulfurized is also controlled by the rate at which the concentrate pellets pass through the furnace. Adjusting the flow rate of pellets to give a residence time of about 13 hours, 4 hours in the upper heating zone and 9 hours in the lower heating zone, gives a pellet product having the following typical analysis:

|  | Percent |
|---|---|
| Zn | 56.0 |
| Fe | 9.5 |
| S | 0.01 |
| Pb | 0.005 |
| Cd | 0.02 |

The lead content of the concentrate has been reduced from 0.24 to 0.005%, the cadmium content from 0.11 to 0.02% and the sulfur content from 25.9 to 0.01%.

It is seen that it is more difficult to eliminate cadmium than it is to eliminate lead. Experiments have shown that maximum deleading at 1150° C. is achieved in about 1 hour but that while most of the cadmium is also eliminated in the first hour, 3–4 hours at this temperature are required before the cadmium elimination curve levels off. The residence time of the pellets in the deleading zone is set at about 4 hours in order to promote maximum cadmium removal. Virtually complete sulfur elimination is obtained by setting about 9 hours' residence time for the concentrate in the desulfurization zone.

The hot purified and desulfurized pellets of concentrate are removed at the bottom of the furnace. Not shown in the figures, the pellets are air-cooled; their heat content may be used to heat the air being fed to the furnace. The crush strength of the pellets is about 70 pounds and they are more readily reduced in an electrothermic zinc reduction furnace than conventional sinter. In the event pellets of greater mechanical strength are required, the pellets may be further hardened by heating in air at about 1225° C. Under these conditions, the crush strength of the pellets is raised to over 100 pounds after 10 minutes' heating and to about 200 pounds after 1 hour of heating.

Certain preferred embodiments of the present invention have been disclosed for the purpose of illustrating the invention. It is evident that various changes and modifications may be made without departing from the scope and

I claim:

1. A method for preparing zinc concentrate pellets for use in an electrothermic zinc reduction furnace which comprises: forming pellets about ½ inch in diameter from a zinc sulfide ore concentrate containing lead and cadmium impurities and having a particle size distribution of about 98% −100 mesh and 50–60% −325 mesh prior to pellet formation; passing said pellets downward through a vertical shaft furnace having two heating zones; subjecting said pellets in an upper heating zone to a temperature of about 1150° C. in an atmosphere deficient in oxygen to volatilize and drive off lead and cadmium sulfides from the pellets; subjecting said pellets in a lower heating zone to a temperature between about 900–1025° C. in the presence of sufficient oxygen to convert the sulfide sulfur content of the concentrate to sulfur dioxide and the zinc values to zinc oxide; and passing at least some of the sulfur dioxide from the second heating zone to the first heating zone.

2. A method according to claim 1 wherein the desulfurized pellets are cooled by heat exchange with an oxygen-containing gas.

3. A method according to claim 1 wherein the zinc ore concentrate is mixed with electrothermic reduction furnace residue fines.

4. A method according to claim 1 wherein the zinc ore concentrate is mixed with a binding agent.

5. A method according to claim 4 wherein the binding agent is bentonite.

6. A method according to claim 5 wherein zinc sulfate liquor is employed in forming the pellets of zinc concentrate.

References Cited

UNITED STATES PATENTS

| 1,874,370 | 8/1932 | Simonds | 75—6 |
| 1,930,370 | 10/1933 | Queneau | 75—7 |
| 2,747,966 | 5/1956 | Calbeck | 75—86 |
| 2,855,287 | 10/1958 | Cyr | 75—86 |

FOREIGN PATENTS 718,769  11/1954  Great Britain.

BENJAMIN HENKIN, *Primary Examiner.*